United States Patent [19]

Yokoyama et al.

[11] 4,128,999

[45] Dec. 12, 1978

[54] HYDRAULIC TORQUE CONVERTER WITH A LOCK-UP CLUTCH AND AN AXIALLY RETRACTABLE REACTOR

[75] Inventors: Akinori Yokoyama, Yokohama; Iwao Morinaka, Tokyo, both of Japan

[73] Assignee: Kabushiki Kaisha Komatsu Seisakusho, Tokyo, Japan

[21] Appl. No.: 854,100

[22] Filed: Nov. 23, 1977

[30] Foreign Application Priority Data

Nov. 24, 1977 [JP] Japan .................... 52-156377[U]

[51] Int. Cl.² ............................................. F16D 33/04
[52] U.S. Cl. ................................. 60/347; 60/353; 60/437; 192/3.3
[58] Field of Search ................... 192/3.28, 3.29, 3.3; 60/334, 341, 342, 347, 352, 353, 367, 437

[56] References Cited

U.S. PATENT DOCUMENTS

| 3,220,187 | 11/1965 | Perkins | 60/352 |
| 3,975,906 | 8/1976 | Eaton et al. | 60/347 |

*Primary Examiner*—Edgar W. Geoghegan
*Attorney, Agent, or Firm*—Armstrong, Nikaido, Marmelstein & Kubovcik

[57] ABSTRACT

In a torque converter equipped with a fluid operated lock-up clutch to provide either a fluid or a rigid mechanical connection between an input and an output shaft, the reactor member is arranged for movement along the converter axis between a working and a retracted position by a fluid operated actuating piston. Upon engagement of the lock-up clutch, the reactor member simultaneously travels from the working to the retracted position, in which latter position the reactor member closes the flow path in the impeller member, in order to minimize power loss incurred by the hydraulic fluid.

6 Claims, 1 Drawing Figure

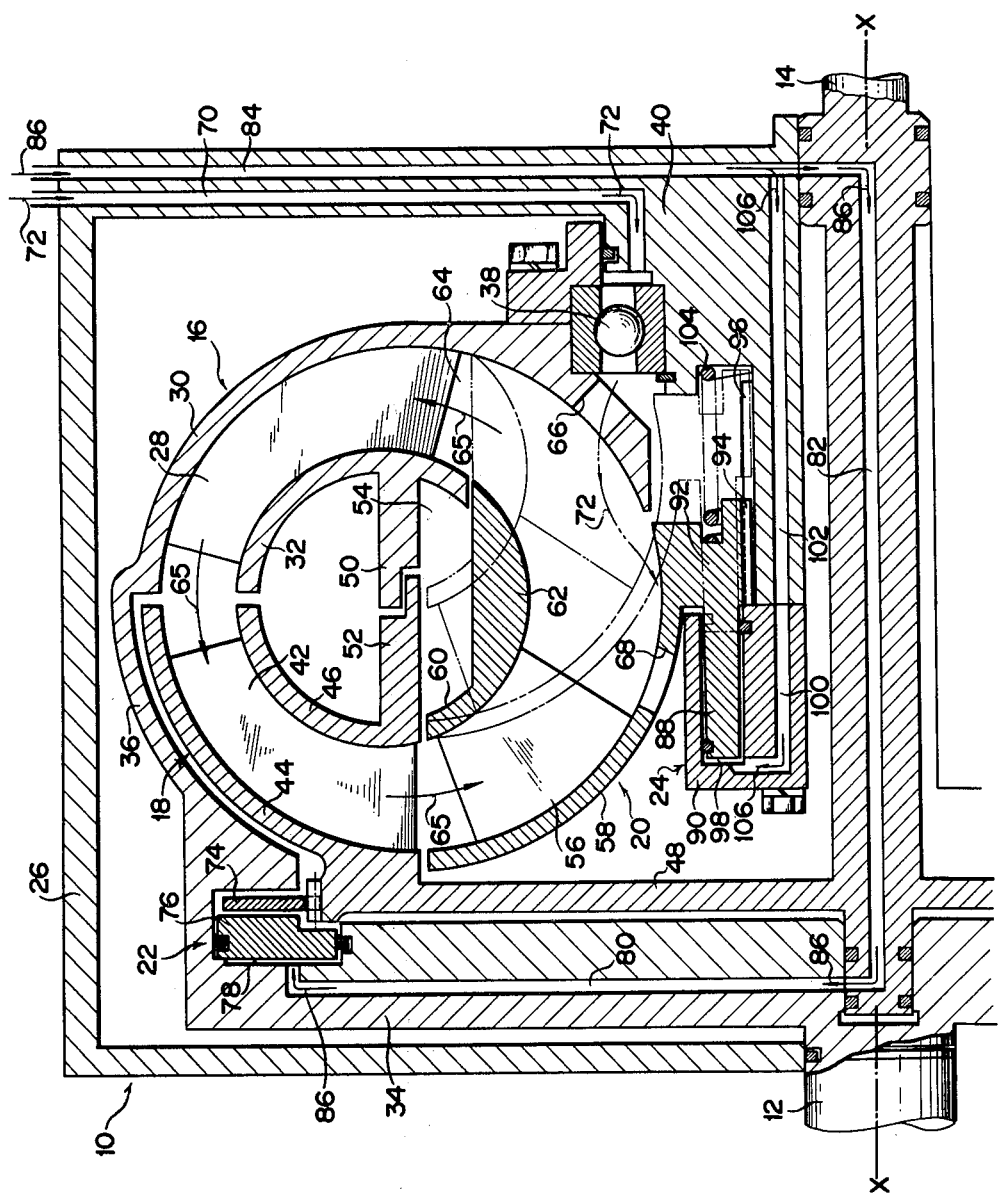

HYDRAULIC TORQUE CONVERTER WITH A LOCK-UP CLUTCH AND AN AXIALLY RETRACTABLE REACTOR

BACKGROUND OF THE INVENTION

1. Field of the Invention

Our invention relates to hydraulic torque converters, and in particular to improvements in a torque converter of the type equipped with a lock-up clutch to permit direct coupling of the converter input and output means for operation in the coupling range, that is, operation in which the torque ratio of the converter is unity.

2. Description of the Prior Art

The lock-up clutch has been used extensively in association with a hydraulic torque converter for operation above the coupling point. During operation in the coupling range, however, the reactor or stator member of the torque converter causes the hydraulic fluid medium within the converter to offer considerable obstruction to the joint rotation of the impeller and the turbine members, resulting in substantial power loss. This defect has heretofore been obviated by mounting the reactor member on a freewheeling mechanism including an overrunning or one-way clutch, which permits the reactor member to revolve freely, or "freewheel," with the fluid upon engagement of the lock-up clutch.

The reactor freewheeling mechanism, however, if expensive in construction, difficult of manufacture, and susceptible to relatively frequent trouble in use, increasing the manufacturing and maintenance costs of the torque converter. Moreover, the freewheeling mechanism for use in or with a large-capacity torque converter is inevitably of such bulk that it cannot possibly be mounted radially inwardly of the converter torus, but on its front or rear side, with the resultant increase in the axial dimension of the converter. Still further, even if the reactor member is mounted on the freewheeling mechanism, power loss arising from the turbulent flow of the fluid medium cannot be prevented completely.

SUMMARY OF THE INVENTION

It is an object of our invention to minimize power loss arising when the input and the output means of a hydraulic torque converter are directly coupled mechanically.

Another object of our invention is to attain the first recited object by use of simple, inexpensive and durable means and hence to materially reduce the manufacturing and maintenance costs of the torque converter.

Stated in brief, our invention is directed to a torque converter comprising a lock-up clutch for providing a mechanical connection between the input and the output means of the converter. The reactor member of the torque converter is made movable along the converter axis between a working and a retracted position. Normally held in the working position to redirect the fluid flow from the turbine member back into the impeller member, the reactor member travels, upon engagement of the lock-up clutch, to the retracted position, in which the reactor member closes the entrance end of the fluid path in the impeller member in order to reduce power loss caused by the fluid.

For the desired movement of the reactor member between the working and the retracted positions, there can be employed a fluid operated actuating piston of annular configuration connected directly to the reactor member. Preferably, the lock-up clutch is also fluid operated, from the same pressurized fluid source as the reactor actuator mechanism, so that the reactor member may be retracted immediately upon engagement of the lock-up clutch.

Advantageously, the reactor actuator mechanism including the annular actuating piston can be compactly installed radially inwardly of the converter torus, without substantially increasing the overall size of the torque converter. It will also be appreciated that the reactor actuator mechanism is simpler and less expensive in construction, easier to manufacture, and more trouble-free in use than the conventional freewheeling mechanism. our invention and the manner of attaining them will become more clearly apparent, and the invention itself will best be understood, from the following description and appended claims taken together with the accompanying drawing showing a preferred embodiment of our invention.

BRIEF DESCRIPTION OF THE DRAWING

The accompanying drawing illustrates, in partial axial section, the hydraulic torque converter constructed in accordance with the principles of our invention.

DESCRIPTION OF THE PREFERRED EMBODIMENT

In the accompanying drawing our invention is shown applied to a hydraulic torque converter, generally designated 10, of the usual three-element type having an input shaft 12 and an output shaft 14 which are oriented collinearly and centered about the converter axis indicated at X-X. Broadly, the torque converter 10 comprises an impeller or pump member 16 connected to the input shaft 12, a turbine member 18 disposed opposite to the impeller member and connected to the output shaft 14, a reactor or stator member 20 disposed radially inwardly of the impeller and the turbine members and movable along the converter axis between a working position indicated by the solid lines and a retracted position indicated by the dot-and-dash lines, a fluid operated lock-up clutch 22 for selectively coupling the impeller and the turbine members and therefore the input and the output shafts, and a fluid operated actuator mechanism 24 for moving the reactor member from the working to the retracted position when the input and the output shafts are directly coupled by the lock-up clutch.

It will be seen that the impeller member 16, the turbine member 18, the reactor member 20, the lock-up clutch 22, and the reactor actuator mechanism 24 are all of annular configuration arranged concentrically about the converter axis X-X and enclosed in a common, stationary housing 26. The impeller member 16 comprises a multiplicity of blades or vanes 28 connected between a shell 30 and a core 32 and adapted to direct the flow of a hydraulic fluid, usually oil, through a path defined between the shell and the core. The shell 28 of the impeller member 16 is shown to be formed integral with the input shaft 12 via a relatively thick drive disc 34 and its peripheral rim 36. The impeller shell 28 is further mounted via a ball bearing 38 on a sleeve 40 formed integral with the converter housing 26, which sleeve is formed axially on the output end, shown directed to the right in the drawing, of the converter housing so as to extend inwardly or toward the input end therefrom. The impeller member 16 is therefore rotatable with the input shaft 12 relative to the converter housing 26.

Disposed opposite to and on the input side of the impeller member 16, the turbine member 18 likewise comprises a multiplicity of flow directing blades 42 connected between a shell 44 and a core 46. The turbine shell 44 is shown to be formed integral with the output shaft 14 via a disc 48 disposed side by side with the drive disc 34. Normally, or when the lock-up clutch 22 is disengaged, the rotation of the impeller member 16 is imparted to the turbine member 18 through the hydraulic fluid medium in the well known manner, resulting in the power tansmission from the input shaft 12 to the output shaft 14 with torque multiplication.

The cores 32 and 46 of the impeller and the turbine members 16 and 18 have portions 50 and 52 bent and directed toward each other so as to define an annular space 54. The reactor member 20 is to be partly received in this space 54 when moved to the retracted position, as will be later described in greater detail.

The reactor member 20 also comprises a multiplicity of flow directing blades 56 connected between a shell 58 and a core 60. Normally held in the working position, the reactor member 20 functions to redirect the fluid flow from the turbine member 18 back into the impeller member 16 and hence to boost the action of the latter. The reactor core 60 has a thickened portion 62 which is capable of closing the entrance end 64 of the fluid flow path in the impeller member 16 when the reactor member 20 travels to the retracted position. The arrows labelled 65 indicate the fluid flow direction in the hydraulic circuit.

Seen at 66 and 68 are bores formed in the impeller shell 30 and the reactor shell 58 for the passage of the hydraulic fluid supplied into the torque converter 10 through a passageway 70 in the converter housing 26, as indicated by arrows labelled 72. Reference will be made to these bores 66 and 68 in the subsequent description of operation.

The fluid operated lock-up clutch 22 comprises an annular friction plate 74 mounted on and positively engaged with the turbine disc 48, and an annular pressure plate 76 accommodated in an annular space formed within the drive disc 34 for axial movement into and out of engagement with the friction plate. The portion of the annular space on the input side of the pressure plate 76 is formed into an actuating fluid chamber 78 which can be placed in and out of fluid pressure communication with a suitable source of pressurized fluid, not shown, via passageways 80, 82 and 84 formed in the drive disc 34, the output shaft 14 and the converter housing 26.

Thus, upon delivery of pressurized fluid into the actuating fluid chamber 78 of the lock-up clutch 22, as indicated by arrows 86, the pressure plate 76 is formed into engagement with the friction plate 74 for rigidly coupling the impeller member 16 and the turbine member 18. The input shaft 12 and the output shaft 14 are then coupled mechanically, so that the torque converter 10, in the strict or narrower sense of the term, is by-passed.

The fluid operated actuator mechanism 24 for moving the reactor member 20 between the working and the retracted positions comprises an annular actuating piston 88 slidably mounted within an annular piston housing 90 rigidly connected to the tip of the sleeve 40 on the converter housing 26 so as to encircle the output shaft 14. The actuating piston 88 has an outward extension 92 which is shown to be integrally connected to the reactor shell 58 and which is internally provided with straight splines 94 for engagement with corresponding external splines 96 on the sleeve 40. The complete reactor member 20 and the actuating piston 88 are therefore restrained from rotation relative to the converter housing 26 and are further constrained to axial movement relative to same.

The piston housing 90 defines an actuating fluid chamber 98 which is in constant communication with the aforesaid passageway 84 in the converter housing 26 via passageways 100 and 102 formed in the piston housing 90 and the sleeve 40. A return spring in the form of a coiled compression spring is mounted at 104 for biasing the actuating piston 88 toward the input end of the converter. Upon delivery of pressurized fluid into the actuating fluid chamber 98, therefore, as indicated by arrows 106, the actuating piston 88 is extended against the bias of the return spring 104 thereby moving the reactor member 20 from the working to the retracted position.

OPERATION

During operation in the torque conversion range, where the torque converter 10 operates to effect torque multiplication, the lock-up clutch 22 is of course held disengaged, and the piston 88 of the reactor actuator mechanism 24 is held in the illustrated retracted position to maintain the reactor member 20 in the working position. The torque converter 10 operates in the well known manner to convert the low torque of the input shaft 12 into a high torque in conjunction with low speed of rotation at the output shaft 14. The torque ratio gradually decreases with the increase in the output speed.

At a certain speed ratio, therefore, the lock-up clutch 22 is engaged to provide a rigid mechanical connection between the input shaft 12 and the output shaft 14 and hence to reduce power loss. As mentioned, the engagement of the lock-up clutch 22 can be accomplished as pressurized fluid is delivered into the clutch actuating fluid chamber 78 via the passageways 80, 82 and 84. Since the passageway 84 in the converter housing 26 is in constant communication with the actuating fluid chamber 98 of the reactor actuator mechanism 24 via the passageways 100 and 102, part of the pressurized fluid charged into the passageway 84 is delivered into this chamber 98 thereby causing extension of the actuating piston 88 against the bias of the return spring 104.

It is thus seen that the reactor member 20 of this torque converter 10 automatically travels from the working to the retracted position along the converter axis X-X simultaneously with the establishment of the rigid mechanical connection between the input and the output shaft 12 and 14. In this retracted position the reactor member 20 has the thickened portion 62 of its core 60 held against the inside surface of the impeller shell 30 thereby substantially closing the entrance end 64 of the fluid flow path in the impeller member 16. As a consequence, the fluid delivered into the converter housing 26 through the passageway 70 flows through the bores 66 and 68 in the impeller shell 30 and the reactor shell 58 as indicated by the arrow headed dot-and-dash line 72.

With the reactor member 20 thus moved to and maintained in the retracted position during operation in the coupling range, the impeller and the turbine members 16 and 18 in joint rotation encounter considerably less opposing forces from the hydraulic fluid than in the case where the reactor member is left in the working position. It is therefore possible to effect efficient power transmission through the torque converter 10 in the coupling range.

The torque converter 10 can be returned to operation in the torque conversion range as the actuating fluid chambers 78 and 98 of the lock-up clutch 22 and the reactor actuator mechanism 24 are blocked from communication with the unshown pressurized fluid source and placed in communication with a fluid drain. The lock-up clutch 22 is then disengaged, and the actuating piston 88 is retracted under the bias of the return spring 104 thereby moving the reactor member 20 back to the working position. It will be seen, however, that even were it not for the return spring 104, the reactor member 20 could return to the working position under the pressure of the hydraulic fluid, although the provision of the return spring is preferable to afford more positive and reliable operation.

The structural details of the torque converter disclosed herein are believed to admit of many modifications and changes within the usual knowledge of the persons skilled in the art. The appended claims, therefore, are intended to cover all such modifications and equivalents falling within the true spirit of our invention.

We claim:

1. A torque converter capable of selectively providing a fluid connection and a rigid mechanical connection between input and output means for power transmission, comprising in combination:
   an impeller member connected to and driven by the input means;
   a turbine member disposed opposite to the impeller member and adapted to be driven by the latter through the medium of the fluid, the turbine member being connected to the output means;
   a reactor member movable axially of the torque converter between a working and a retracted position, the reactor member when in the working position being effective to redirect the fluid flowing out of the turbine member back into the impeller member to boost the action of the latter;
   a lock-up clutch for selectively providing the mechanical connection between the input and the output means; and
   actuator means for moving the reactor member from the working to the retracted position in order to minimize power loss incurred by the fluid when the input and the output means are coupled by the lock-up clutch.

2. The torque converter as recited in claim 1, wherein the reactor member has a core which is adapted to close the entrance end of a fluid flow path in the impeller member when the reactor member is in the retracted position.

3. The torque converter as recited in claim 1, wherein the actuator means includes a fluid operated actuating piston connected to the reactor member.

4. The torque converter as recited in claim 3, wherein the actuating piston is of annular configuration and is disposed radially inwardly of the reactor member, the reactor member including a shell which is formed integral with the actuating piston.

5. A torque converter capable of selectively providing a fluid connection and a rigid mechanical connection between coaxially oriented input and output shafts for effective power transmission therethrough, comprising in combination:
   an impeller member connected to and driven by the input shaft;
   a turbine member disposed opposite to and on the input side of the impeller member and adapted to be driven by the latter through the medium of a fluid, the turbine member being connected to the output shaft;
   a reactor member movable along the aligned axes of the input and the output shafts, the reactor member being normally held in a working position for redirecting the fluid flowing out of the turbine member back into the impeller member to boost the action of the latter and, on actuation, being moved to a retracted position on the output side of the working position;
   the reactor member including a core capable of closing the entrance end of a fluid flow path in the impeller member when the reactor member is in the retracted position;
   a fluid operated lock-up clutch for selectively coupling the input and the output shafts; and
   fluid operated actuator means including an actuating piston connected to the reactor member and operated simultaneously with the lock-up clutch for moving the reactor member from the working to the retracted position;
   whereby upon establishment of the rigid mechanical connection between the input and the output shafts by the lock-up clutch, the reactor member automatically travels from the working to the retracted position in order to minimize power loss incurred by the fluid.

6. The torque converter as recited in claim 5, further comprising a return spring biasing the actuating piston in such a direction that the reactor member tends to travel from the retracted to the working position.

* * * * *